(12) United States Patent
Kurosawa

(10) Patent No.: US 7,579,750 B2
(45) Date of Patent: Aug. 25, 2009

(54) ULTRASONIC MOTOR

(75) Inventor: Yuichi Kurosawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 70 days.

(21) Appl. No.: 11/955,639

(22) Filed: Dec. 13, 2007

(65) Prior Publication Data

US 2008/0143213 A1    Jun. 19, 2008

(30) Foreign Application Priority Data

Dec. 14, 2006    (JP)    ............... 2006-336539

(51) Int. Cl.
*H01L 41/09*    (2006.01)
*H01L 41/107*    (2006.01)

(52) U.S. Cl. ................. 310/316.02; 310/317

(58) Field of Classification Search ............ 310/316.01, 310/316.02, 317
See application file for complete search history.

(56) References Cited

U.S. PATENT DOCUMENTS

| | | | | |
|---|---|---|---|---|
| 5,276,376 A | * | 1/1994 | Puskas | 310/317 |
| 5,578,888 A | * | 11/1996 | Safabakhsh | 310/328 |
| 5,821,667 A | * | 10/1998 | Takagi et al. | 310/317 |
| 6,384,511 B1 | * | 5/2002 | Sakai | 310/316.01 |
| 2006/0001330 A1 | * | 1/2006 | Matsuzaki et al. | 310/316.01 |
| 2007/0057596 A1 | | 3/2007 | Kurosawa | |
| 2007/0085448 A1 | | 4/2007 | Kurosawa | |
| 2007/0145859 A1 | | 6/2007 | Kurosawa | |

FOREIGN PATENT DOCUMENTS

JP    9-98587    4/1997
JP    2000-060154    2/2000

OTHER PUBLICATIONS

English language Abstract of JP 9-98587.
English language Abstract of JP 2000-060154.
U.S. Appl. No. 11/958,591 to Kurosawa, which was filed on Dec. 18, 2007.
U.S. Appl. No. 11/865,848 to Kurosawa, which was filed on Oct. 2, 2007.

* cited by examiner

*Primary Examiner*—Thomas M Dougherty
(74) *Attorney, Agent, or Firm*—Greenblum & Bernstein, P.L.C.

(57) ABSTRACT

An ultrasonic motor includes a stator that includes a comb body with a plurality of circumferentially-arranged comb-like projections and a piezoelectric body integrally mounted on the comb body, a rotor rotatable with respect to the stator, the rotor having a contact surface that establishes pressure contact with the stator, and a driving circuit configured to apply a radio frequency voltage for driving the piezoelectric body to the piezoelectric body. The driving circuit includes a voltage generating unit configured to generate a first radio frequency voltage of which a frequency is randomly varied during a predetermined time period after start-up of the ultrasonic motor.

11 Claims, 6 Drawing Sheets

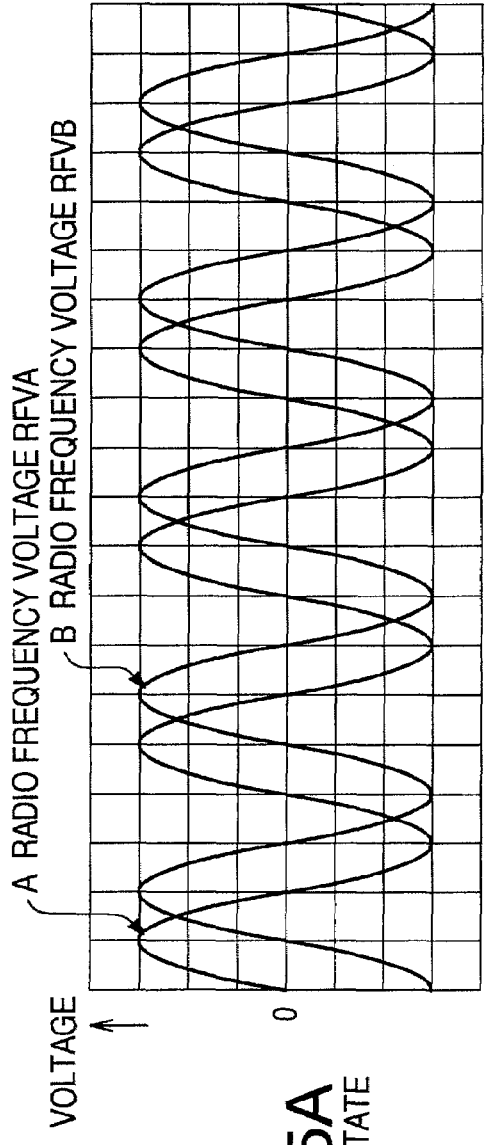
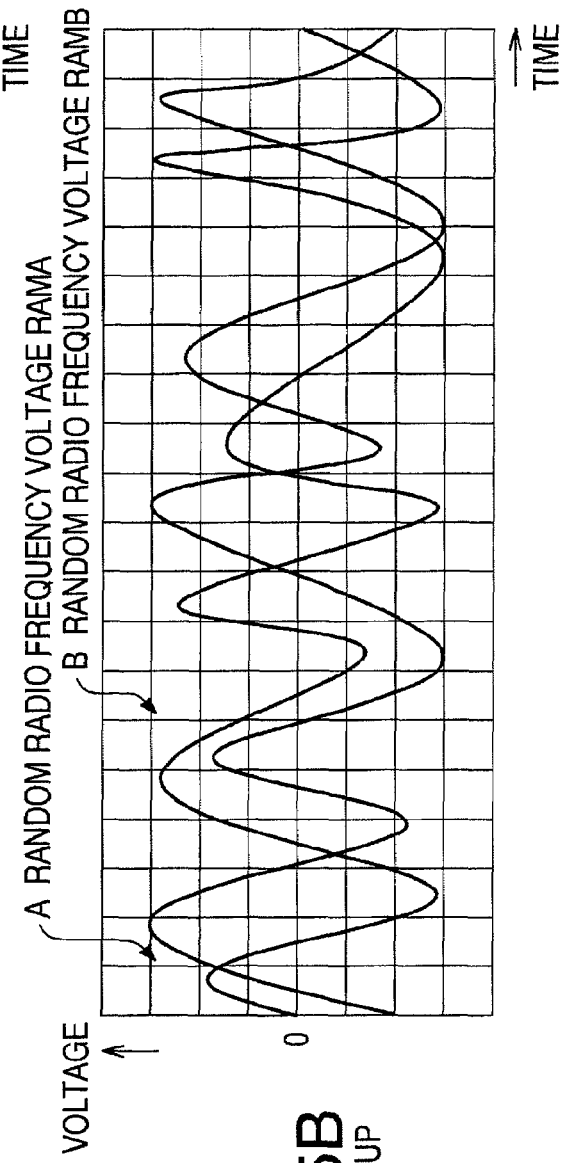
FIG.5A IN STEADY STATE
FIG.5B AT START-UP

ULTRASONIC MOTOR

BACKGROUND OF THE INVENTION

The present invention relates to an ultrasonic motor, particularly, to an ultrasonic motor of which rising characteristics at start-up are improved.

An ultrasonic motor is configured with a stator, which includes a piezoelectric body with a plurality of polarized piezoelectric segments circumferentially arranged, and a rotatable disc-shaped or annular rotor in contact with the stator under a predetermined pressure. In the ultrasonic motor, the piezoelectric body of the stator is vibrated with radio frequency voltage being applied thereto. The induced vibration of the piezoelectric body is enhanced in a circumferential direction of the stator by a comb body provided integrally to the piezoelectric body such that the comb body is driven to induce a traveling vibration wave in the circumferential direction. Thereby, the rotor, which frictionally engages with the piezoelectric body, can be rotated around an axis thereof. For example, the above features are disclosed in Japanese Patent Provisional Publication No. 2000-60154. The comb body has a function of enlarging amplitude of the vibration of the piezoelectric body. However, since the amplitude is generally one micrometer to three micrometers, it is required that the comb body establishes close contact with the rotor evenly in the circumferential and radial directions of the stator, and that both close-contact surfaces between the comb body and the rotor are configured as pressure contact surfaces with a desired pressure contact force being applied thereto, so as to improve rotational efficiency of the rotor (i.e., rotational energy of the rotor to vibration energy of the stator). Therefore, when the ultrasonic motor has not been driven for a long time, the pressure contact surfaces between the comb body and the rotor come into a state of interfacial adhesion due to the pressure contact force, and it increases a static frictional force therebetween. Thereby, a large torque is needed for rotating the rotor at start-up of the ultrasonic motor, and the ultrasonic motor cannot begin smooth rotation, that is, the rising characteristics of the ultrasonic motor at the start-up is worsened. In the worst case, the motor cannot be rotated.

In order to solve such a problem at the start-up of the motor, there has been proposed a technology in which a resin layer with a low frictional coefficient is formed on any of the pressure contact surfaces between the comb body and the rotor to reduce the static frictional force therebetween. Fluorocarbon resin such as polytetrafluoroethylene (PTFE) can be cited as an example of the resin layer. In Japanese Patent Provisional Publication No. HEI 9-98587, there is proposed a technique in which a slider formed from polymer resin is attached onto a surface of the rotor. The technique is regarded as one of possible solutions that can prevent the interfacial adhesion between the pressure contact surfaces of the comb body and the rotor and reduce the static frictional force. However, in this kind of resin, when temperature rises along with the rotation of the motor, the frictional coefficient thereof decreases, and both the pressure contact surfaces between the comb body and the rotor come into a slippery state. Hence, the traveling vibration wave of the comb body cannot efficiently be transmitted to the rotor, and thereby the rotational efficiency of the ultrasonic motor gets worse.

Thus, the resin layer with a low frictional coefficient formed on one of the pressure contact surfaces between the comb body and the rotor might cause the worsened rotational efficiency of the ultrasonic motor, and is not necessarily useful. In view of the above problem, there can be proposed a technique in which, instead of forming the resin layer, a high voltage is applied to the ultrasonic motor or the frequency of a radio frequency voltage is made higher only at the start-up, increasing a torque of rotation torque so as to release the adhesion. However, it is necessary for releasing the adhesion in a static state to apply a very large rotation torque to between the comb body and the rotor. Therefore, the voltage or the frequency to be applied to the ultrasonic motor is required to be very high. This is because, similarly to the case of the static frictional coefficient, a force for releasing an adhesion state where two substances are adhered to each other in their static states is larger than a force for releasing an adhesion state where the two substances are adhered to each other in their micro-vibrating states. Hence, a high voltage generating circuit configured to generate a very high voltage has to be employed as a driving circuit of the ultrasonic motor, and it results in an intricate and expensive driving circuit. In addition, since a temporarily-applied high voltage may cause a damage of the piezoelectric body, applying the high voltage to the ultrasonic motor each time starting up the motor may lead to rapid deterioration of the motor and thereby to a short life of the motor. Further, the ultrasonic motor begins to rotate at a high speed immediately after the adhesion state is released in a state where the high voltage is being applied, and a shock vibration and/or impact noise that may be generated at that time is a significant problem.

SUMMARY OF THE INVENTION

The present invention is advantageous in that there can be provided an ultrasonic motor that makes it possible to release adhesion caused in the motor without making a rotation efficiency thereof worse, and thereby, of which rising characteristics at start-up can be improved.

According to an aspect of the present invention, there is provided an ultrasonic motor, which includes a stator that includes a comb body with a plurality of circumferentially-arranged comb-like projections and a piezoelectric body integrally mounted on the comb body, a rotor rotatable with respect to the stator, the rotor having a contact surface that establishes pressure contact with the stator, and a driving circuit configured to apply a radio frequency voltage for driving the piezoelectric body to the piezoelectric body. The driving circuit includes a voltage generating unit configured to generate a first radio frequency voltage of which a frequency is randomly varied during a predetermined time period after start-up of the ultrasonic motor.

Optionally, the voltage generating unit may include a first voltage generating portion configured to generate the first radio frequency voltage, a second voltage generating portion configured to generate a second radio frequency voltage with a constant frequency, and a selecting portion configured to select the first radio frequency voltage generated by the first voltage generating portion during the predetermined time period after the start-up of the ultrasonic motor, and to select the second radio frequency voltage generated by the second voltage generating portion thereafter.

Alternatively or optionally, the voltage generating unit may be configured to generate a second radio frequency voltage with a constant frequency. In this case, the driving circuit may further include a control unit configured to control the voltage generating unit to generate the first radio frequency voltage during the predetermined time period after the start-up of the ultrasonic motor and to generate the second radio frequency voltage thereafter.

Yet optionally, the first radio frequency voltage may include two kinds of radio frequency voltages, at least one of which has a frequency being randomly varied, and the second radio frequency voltage may include two kinds of radio frequency voltages, which have a same frequency, a same amplitude, and phases different from each other by $\pi/2$.

Optionally, the voltage generating unit may be configured to generate the first radio frequency voltage with at least one of a phase and amplitude thereof being randomly varied as well as the frequency thereof.

Still optionally, the predetermined time period may be approximately 100 μsec.

BRIEF DESCRIPTION OF THE ACCOMPANYING DRAWINGS

Figure 3:
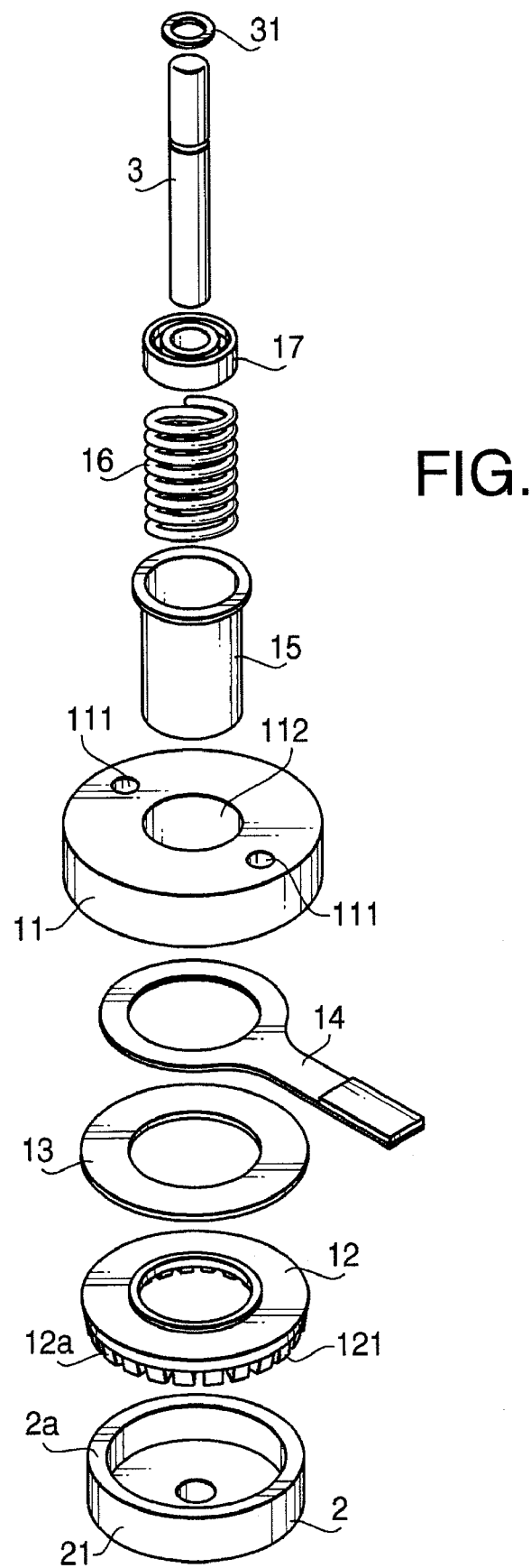

FIG. 3 partially shows an exploded perspective view of the ultrasonic motor in the first embodiment according to the present invention.

Figure 4:
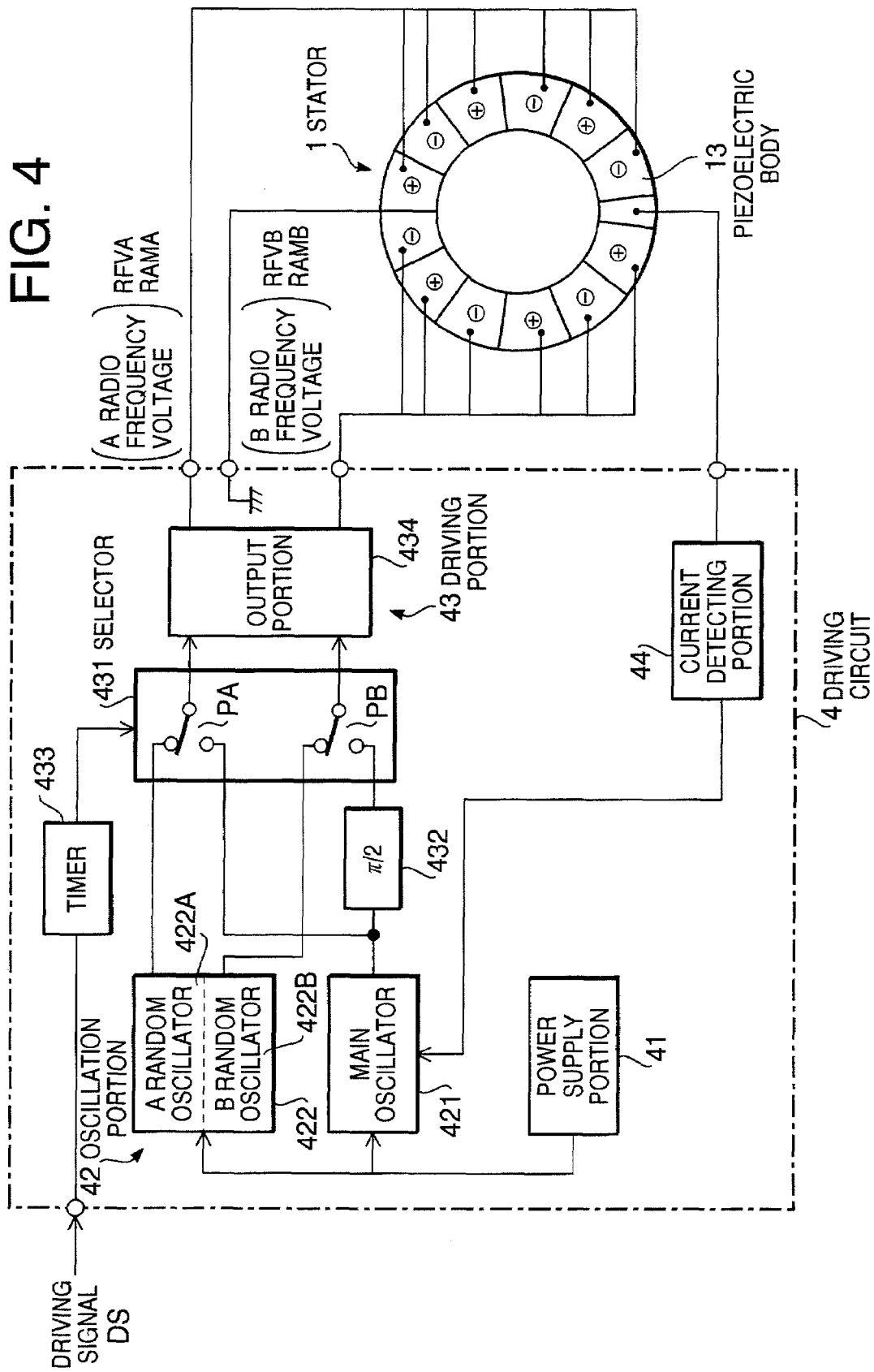

FIG. 4 is a diagram schematically showing a configuration of a driving circuit in the first embodiment according to the present invention.

FIG. 5A is a diagram exemplifying waveforms of radio frequency voltages in a steady state in the first embodiment according to the present invention.

FIG. 5B is a diagram exemplifying waveforms of random radio frequency voltages at start-up in the first embodiment according to the present invention.

Figure 6:
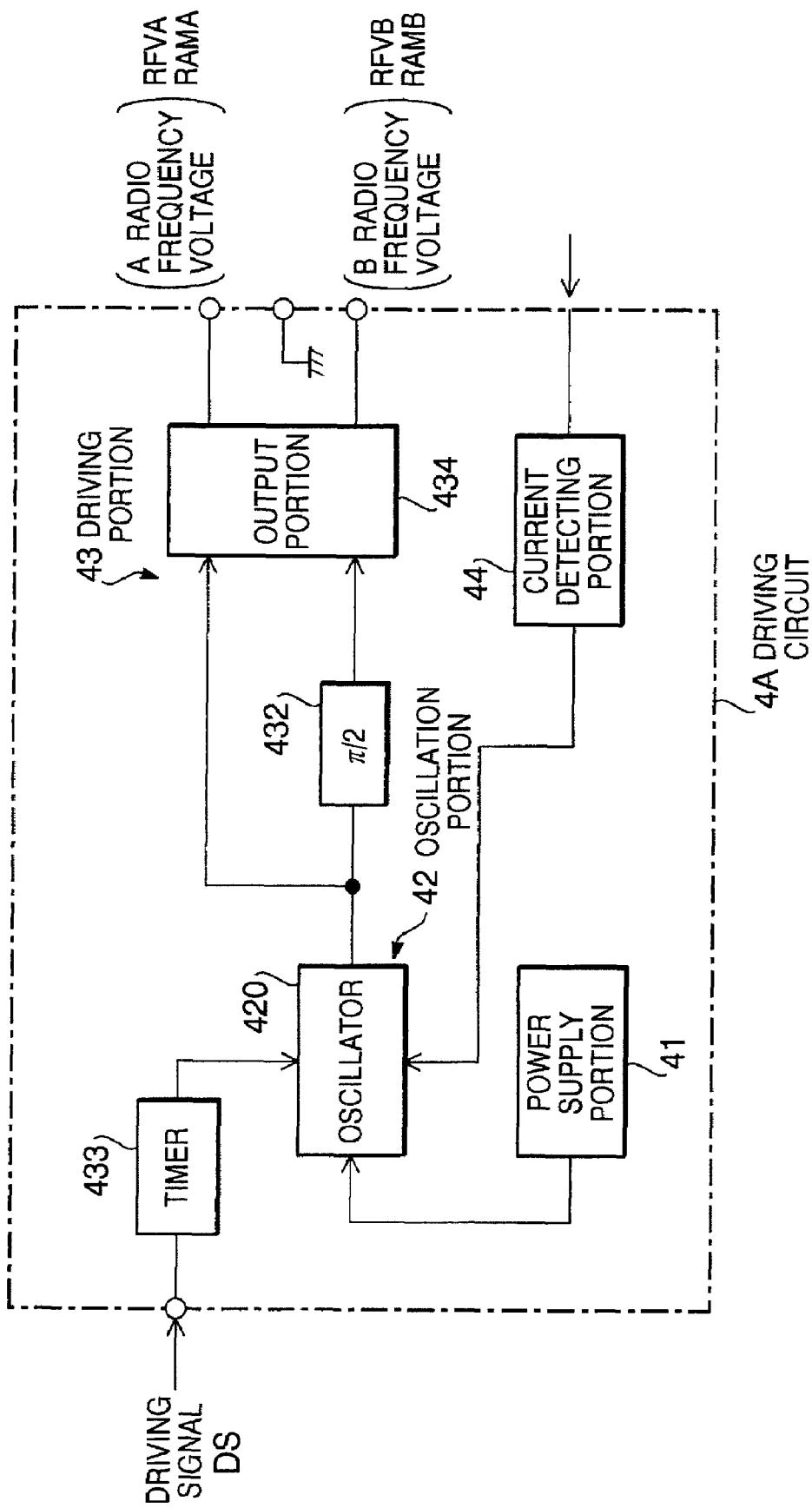

FIG. 6 is a diagram schematically showing a configuration of a driving circuit in a second embodiment according to the present invention.

DETAILED DESCRIPTION OF THE EMBODIMENTS

Figure 1:
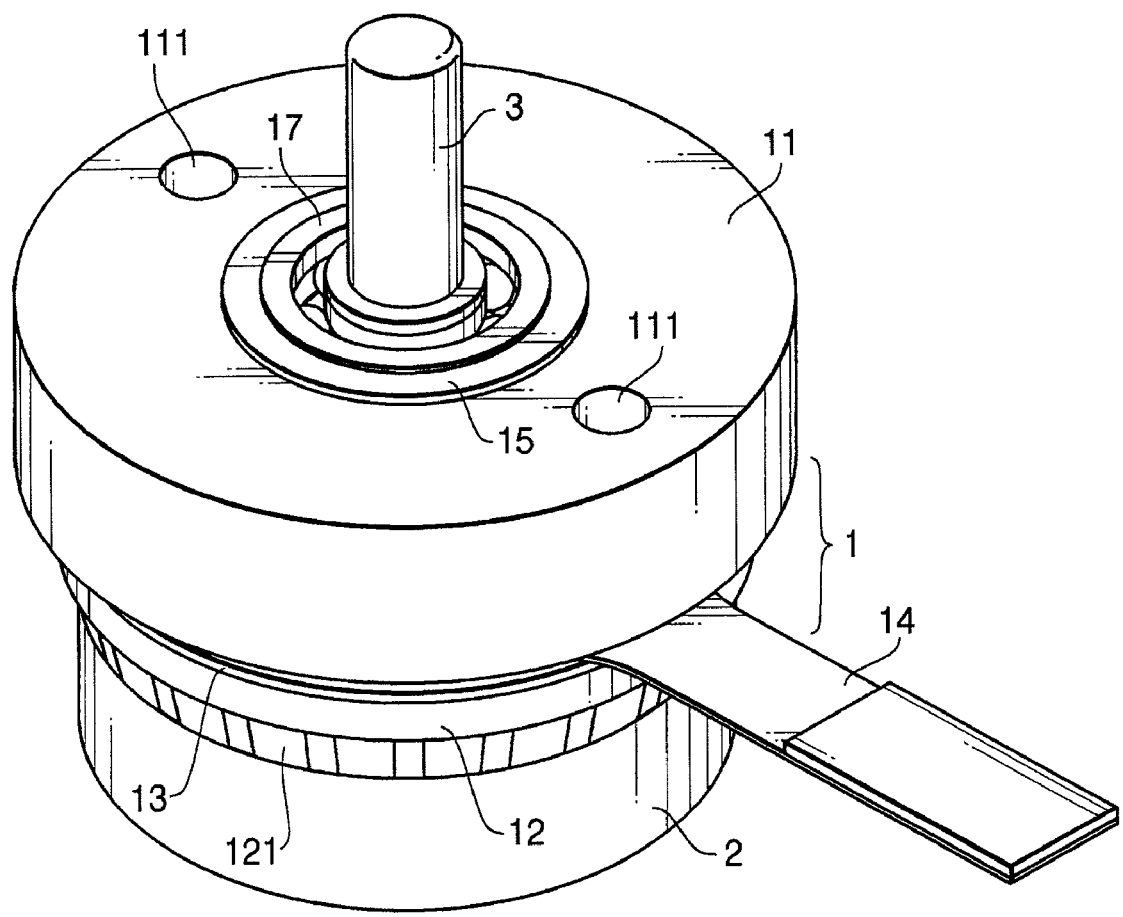
FIG. 1 is an external perspective view of an ultrasonic motor in a first embodiment according to the present invention.
Figure 2:
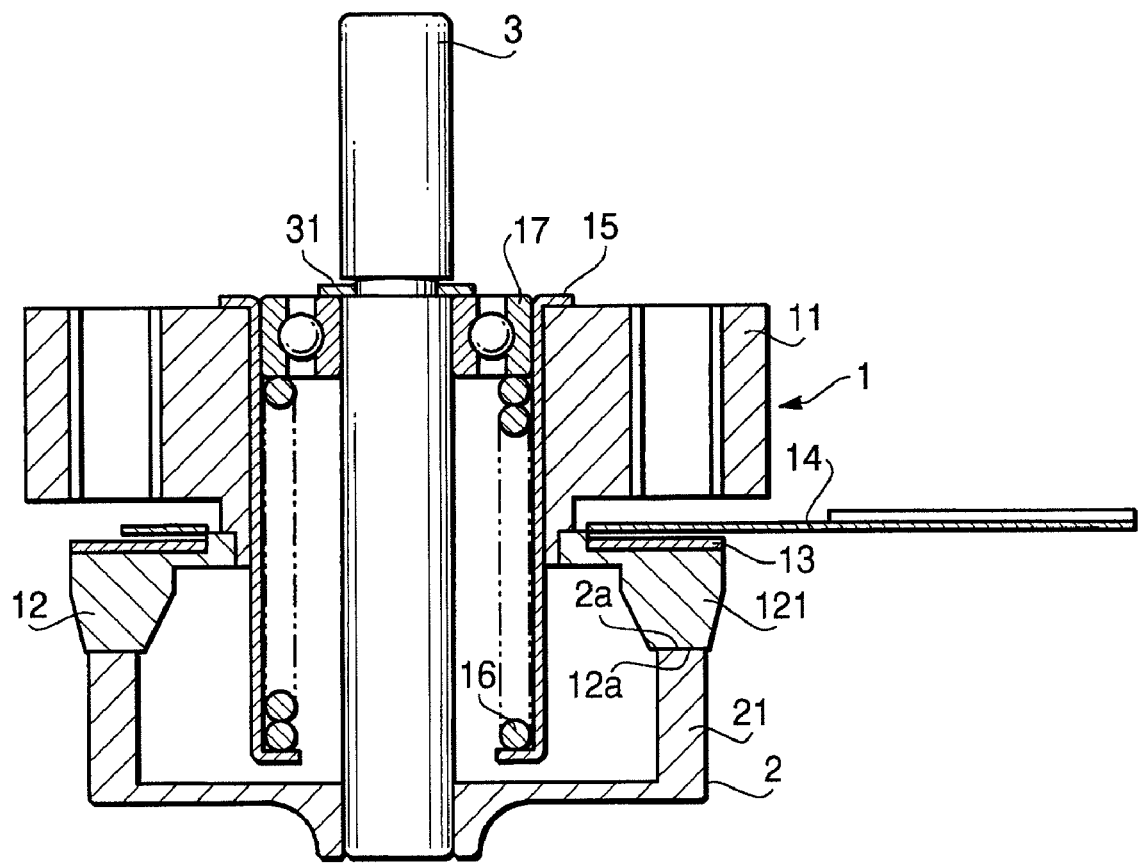
FIG. 2 is a cross-sectional view of the ultrasonic motor along a plane including a center axis of a rotating shaft thereof in the first embodiment according to the present invention.

Embodiments according to aspects of the present invention will be described with reference to the accompanying drawings. FIG. 1 is an external perspective view of an ultrasonic motor in a first embodiment. FIG. 2 is a cross-sectional view of the ultrasonic motor along a plane including a center axis of a rotating shaft 3 thereof. FIG. 3 partially shows an exploded perspective view of the ultrasonic motor. As shown in FIGS. 1 to 3, there is integrally provided under an annular pedestal 11 having mounting holes 111 for mounting the motor, a short-cylinder-shaped comb body 12 that includes a plurality of comb-like projections 121 circumferentially arranged. In addition, there is integrally mounted on the comb body 12 an annular thin-plate-shaped piezoelectric body 13 that includes a plurality of polarized segments circumferentially arranged so as to correspond to the comb-like projections 121, respectively. A stator 1 is configured with the piezoelectric body 13 and comb body 12. Further, a radio frequency voltage can be applied to the piezoelectric body 13 from a below-mentioned driving circuit via a flexible board 14. A shaft hole 112 is opened at a center of the pedestal 11, and a cylinder-shaped bush 15 is fixed on an inner circumferential surface of the shaft hole 112. In addition, a ball bearing 17 is provided at an upper end portion inside the bush 15, rotatably supporting the rotating shaft 3. A washer 31 prevents the rotating shaft 3 from pulling out of the ball bearing 17. A rotor 2 is attached to a lower end portion of the rotating shaft 3. The rotor 2 is formed in a short cylinder shape such that an upper end surface of a peripheral wall 21 thereof, i.e., a pressure contact surface 2a thereof establishes pressure contact with a surface of each of the comb-like projections 121, namely, a pressure contact surface 12a of the comb body 12. Furthermore, a compression coil spring 16 is provided between a lower end portion of the bush 15 and the ball bearing 17 in an axial direction. By an elastic force of the compression coil spring 16 in the axial direction, the ball bearing 17 and the rotating shaft 3 supported by the ball bearing 17 are biased in an upper direction, and the pressure contact surface 2a of the peripheral wall 21 of the rotor 2 is biased toward the surface 12a of the comb body 12 of the stator 1.

FIG. 4 is a circuit diagram for applying a radio frequency voltage to the aforementioned piezoelectric body 13. The piezoelectric body 13, with the annular shape, is mounted on the comb body 12 and has the plurality of polarized segments circumferentially arranged. FIG. 4, as a view showing a frame format, shows an aspect where the piezoelectric body 13 has 12 polarized segments configured such that positive pole segments and negative pole segments are alternately arranged in the circumferential direction. A sine radio frequency voltage $[V_0 \cdot \sin \omega t]$ is applied to a plurality of right-side polarized segments of the piezoelectric body 13 from the driving circuit 4 as an A radio frequency voltage RFVA. Meanwhile, a cosine radio frequency voltage $[V_0 \cdot \cos \omega t = V_0 \cdot \sin(\omega t - \pi/2)]$ is applied to a plurality of left-side polarized segments of the piezoelectric body 13 as a B radio frequency voltage RFVB which is different in a phase from the RFVA by $\pi/2$ (¼ wavelength). In this way, the piezoelectric body 13 is vibrated by applying the radio frequency voltages with different phases, and the vibration is enhanced in the circumferential direction with the comb body 12 integrally provided to the piezoelectric body 13. Hence, the comb body 12 is driven so as to generate a vibration wave traveling in the circumferential direction, and thereby the rotor 2, which establishes pressure contact with and engages with the comb body 12, is rotated around the rotation shaft 3.

The aforementioned driving circuit 4 is configured to output a radio frequency voltage to the piezoelectric body 13 based on an externally inputted driving signal DS. The driving circuit 4 includes a power supply portion 41, oscillation portion 42 that generates a radio frequency signal based on an electrical power supplied by the power supply portion 41, and driving portion 43 that generates and outputs the A radio frequency voltage RFVA and B radio frequency RFVB, which have different phases as described above, based on the radio frequency signal generated by the oscillation portion 42. Further, using a characteristic that a consumption current of the ultrasonic motor driven by the driving circuit 4 is maximum at a vibration frequency of the piezoelectric body 13, that is, at a resonant frequency of the comb body 12, the driving circuit 4 is provided with a current detecting portion 44 that detects the consumption current of the piezoelectric body 13 and configured to perform feedback control of an oscillation frequency of the radio frequency voltage generated by the oscillation portion 42 such that the consumption current detected by the current detecting portion 44 is maximum, so as to supply an appropriate frequency voltage to the piezoelectric body 13.

In the present embodiment, the oscillation portion 42 includes a main oscillator 421 that generates a main frequency signal with a constant frequency, amplitude, and phase and a random oscillator 422 that generates a random frequency signal with an non-constant frequency, amplitude, and phase. The main oscillator 421 includes a control portion (not shown) incorporated therein, which compares the value of the current detected by the current detecting portion 44 to a standard current and performs feedback control of the oscillation frequency in the main oscillator 421 such that the detected current is maximum. The random oscillator 422 is configured with a random oscillator that generates a frequency signal corresponding to a random value generated, for example, by a CPU. The random oscillator 422 includes an A random oscillator 422A and B random oscillator 422B, each of which generates a random frequency signals with its own frequency, phase, and amplitude. Here, it is very critical that the frequency signal generated by each of the random oscillators 422A and 422B is a frequency signal of which the frequency varies within a frequency range in which the piezoelectric body 13 can vibrate, in other words, within a responsive frequency range of the ultrasonic motor.

The driving portion 43 is provided with a selector 431 for selecting a signal between the main frequency signal from the main oscillator 421 and the random frequency signal from the random oscillator 422. The selector 431 is configured as a two-port selector with a first port PA and second port PB. The first port PA is configured to select and output a signal between the main frequency signal from the main oscillator 421 and the A random frequency signal from the A random oscillator 422A. Meanwhile, the second port PB is configured to select and output a signal between the B random frequency signal from the B random oscillator 422B and a phase-shifted main frequency signal of which a phase is shifted through a phase shifter 432 by $\pi/2$ from the phase of the main frequency signal generated by the main oscillator 421. Further, the driving circuit 4 is provided with a timer 433 that controls the selector 431 to select the random frequency signals until the timer 433 measures a predetermined time period (approximately 100 µsec in this case) after the driving signal DS has been inputted into the driving circuit 4, and to select the main frequency signals after that. Furthermore, the driving circuit 4 includes an output portion 434 that receives the frequency signals selected by the first port PA and second port PB of the selector 431, and generates and outputs the A radio frequency voltage RFVA and the B radio frequency voltage RFVB based on the selected frequency signals. The outputted A radio frequency voltage RFVA and B radio frequency voltage RFVB are generated as voltage signals with a frequency, phase, and amplitude that correspond the frequency, phase, and amplitude of the inputted frequency signal.

In the ultrasonic motor of the first embodiment, when the A radio frequency voltage RFVA and B radio frequency voltage RFVB are applied to polarized segments of the piezoelectric body 13, as shown in FIG. 4, via the flexible board 14, the piezoelectric body 13 is vibrated, and the comb body 12 integrally formed with the piezoelectric body 13 is vibrated (see FIG. 2). Thereby, the plurality of comb-like projections 121 circumferentially arranged are displaced in the circumferential direction so as to induce the traveling vibration wave. By the biasing force of the compression coil spring 16, the pressure contact surface 2a of the rotor 2 is pressed onto the pressure contact surface 12a of the comb body 12 under pressure. By the pressure contact, a frictional force is caused between the pressure contact surface 4a of the rotor 2 and the pressure contact surface 12a of the comb body 12. Consequently, the rotor 2 is turned in the circumferential direction, and the rotor 2 and the rotation shaft 3 supporting the rotor 2 are rotated. A rotating force of the rotation shaft 3 is transmitted outside via a gear (not shown) attached to the rotation shaft 3.

In other words, while the ultrasonic motor is in a steady-rotating state, the selector 431 selects the main frequency signal generated by the main oscillator 421 and the phase-shifted main frequency signal of which the phase is shifted through the phase shifter 432 by $\pi/2$ from the phase of the main frequency signal, and inputs the selected signals into the output portion 434. Thereby, as shown in FIG. 5A, the output portion 434 generates the A radio frequency voltage RFVA and the B radio frequency voltage RFVB that have substantially the same frequency and amplitude and the phases different from each other by $\pi/2$ based on the main frequency signal and phase-shifted main frequency signal, and inputs the generated voltages into the piezoelectric body 13, so that the rotor 2 is rotated as described above. Furthermore, alongside it, the current detecting portion 44 detects the value of the current in the piezoelectric body 13 and inputs the detected current value into the main oscillator 421. By performing feedback control of the oscillation frequency based on the inputted current value in the main oscillator 421, the frequency of the main frequency signal generated by the main oscillator 421 becomes a frequency adopted to a resonant frequency of the comb body 12. Thereby, there are outputted the A radio frequency voltage and B radio frequency voltage that can make a rotation efficiency of the ultrasonic motor higher.

Meanwhile, at start-up of the ultrasonic motor, when the driving signal DS is inputted into the driving circuit 4, the timer 433 firstly controls the selector 431 only during a period of 100 µsec to switch the first port PA and second port PB of the selector 431. Thereby, the timer 433 selects the A random frequency signal and B random frequency signal, and outputs the signals into the output portion 434. The output portion 434 outputs the A random radio frequency voltage RAMA and B random radio frequency voltage RAMB that have random frequencies, phases, and amplitudes corresponding to those of the A random frequency signal and B random frequency signal, respectively, and applies the voltages RAMA and RAMB to the piezoelectric body 13. FIG. 5B exemplifies waveforms of the A random radio frequency voltage RAMA and B random radio frequency voltage RAMB at that time. By the voltages RAMA and RAMB, the piezoelectric body 13 is vibrated with a random frequency, phase, and amplitude (voltage), and a random traveling vibration wave is generated in the comb body 12. Namely, the frequency and intensity of the vibration caused in the comb body 12 are randomly varied. Therefore, due to the random vibration of the comb body 12, a vibration with the frequency and amplitude (intensity) thereof being slightly varied is applied to between the both pressure contact surfaces 12a and 2a of the comb body 12 and rotor 2. Consequently, a direction of the traveling vibration wave of the comb body 12 with respect to the rotor 2 is changed by the variation of the vibration of the comb body 12, and thereby the comb body 12 comes into a state as micro-vibrated back and forth in a rotating direction of the rotor 2. Owing to the micro-vibration, a friction state between the both pressure contact surfaces 12a and 2a of the comb body 12 and rotor 2 is transferred from a static friction state to a dynamic friction state. Hence, compared with the conventional method where the comb body 12 is vibrated with respect to the rotor 2 with a constant frequency, phase, and voltage, the adhesion between the both pressure contact surfaces 12a and 2a can be released more easily, and thereby the rotor 2 can be started up more easily.

When the adhesion is released as described above, and the timer 433 completes measuring the predetermined time period of 100 µsec, the selector 431 switches the outputs thereof from the A random frequency signal and B random frequency signal to the main frequency signal and phase-shifted main frequency signal, respectively. Thereby, the output portion 434 outputs the stationary A random radio frequency voltage RAMA and B random radio frequency voltage RAMB with constant frequencies, phases, and amplitudes, and the voltages RAMA and RAMB are applied to the piezoelectric body 13, causing the ultrasonic motor to steadily rotate. In addition, concurrently, the aforementioned feedback control keeps the steady-state rotation of the ultrasonic motor with high rotation efficiency.

Thus, in the first embodiment, the A random radio frequency voltage RAMA and B random radio frequency voltage RAMB with the random frequencies, phases, and voltages are applied to the piezoelectric body 13 only during the very short period at start-up of the ultrasonic motor. Thereby, an irregular vibration is caused in the piezoelectric body 13, and by the irregular vibration, a non-constant relative force is generated between the both pressure contact surfaces 12a and 2a of the comb body 12 and rotor 2. Hence, it is possible to efficiently release the adhesion between the both pressure contact surfaces 12a and 2a. Therefore, since it is unnecessary for releasing the adhesion to apply a high voltage or a voltage with a very high frequency to the piezoelectric body 13, it is possible to prevent the piezoelectric body 13 or ultrasonic motor from being damaged. Furthermore, it is possible to prevent a shock vibration and/or impact noise that may be generated when the adhesion in the ultrasonic motor is released. Since the steady radio frequency voltage is applied after the adhesion of the ultrasonic motor is released, the ultrasonic motor is certainly rotated with a high rotation efficiency.

Here, any A random radio frequency voltage RAMA and B random radio frequency voltage RAMB will do as long as they are voltage signals that cause the piezoelectric body 13, namely, the comb body 12 to irregularly vibrate. For this reason, the both radio frequency voltages RAMA and RAMB are not necessarily radio frequency voltages that have independent frequencies, phases, and amplitudes. In a second embodiment according to the present invention, as shown in FIG. 6, a driving circuit 4A is provided with a single oscillator 420 in the oscillation portion 42 that is configured to selectively generate either a steady frequency signal or a random frequency signal with the timer 433. More specifically, the oscillator 420 generates a random frequency signal with a non-constant frequency, phase, and amplitude during a time period of 100 μsec after the start-up of the ultrasonic motor. Thereafter, the oscillator 420 generates a steady main frequency signal with a constant frequency, phase, and amplitude. Accordingly, in the second embodiment, a plurality of oscillators, as provided in the first embodiment, are not necessary, and the selector 431 is also unnecessary. One of the frequency signals generated by the oscillator 420 is inputted into the output portion 434 as it is, while the other is inputted thereinto with a phase thereof being shifted by $\pi/2$ through the phase shifter 432. The output portion 434 generates and outputs radio frequency voltages each of which has a frequency, phase, and amplitude corresponding to the frequency, phase, and amplitude of each inputted frequency signal. It is noted that, in this configuration, an A random radio frequency voltage RAMA and B random radio frequency voltage RAMB generated based on the random frequency signals have the same frequency and amplitude and their respective phases that are different from each other by $\pi/2$.

In the second embodiment as well, there are applied to the piezoelectric body 13 the A random radio frequency voltage RAMA and B random radio frequency voltage RAMB with the random frequency, phases, and amplitude that are generated based on the random frequency signals during the predetermined time period after the start-up of the ultrasonic motor. Thereby, a vibration with a frequency and amplitude (intensity) being randomly varied is caused in the piezoelectric body 13 or comb body 12. Owing to the random vibration of the comb body 12, a slightly-varying vibration is applied to between the both pressure contact surfaces 12a and 2a of the comb body 12 and rotor 2 in the same manner as the first embodiment. Consequently, the comb body 12 comes into a state as micro-vibrated back and forth in the rotating direction of the rotor 2. Hence, the adhesion between the both pressure contact surfaces 12a and 2a of the comb body 12 and rotor 2 can be released more easily, and thereby the rotor 2 can be started up more easily.

In the first and second embodiments, there have been explained the examples where all of the frequency, phase, and amplitude of the random radio frequency voltage at start-up are randomly varied. However, the phase and amplitude (voltage) are not necessarily required to be varied as long as the random radio frequency voltage with a frequency thereof being randomly varied within a responsive frequency range of the piezoelectric body 13 can cause an irregular vibration in the comb body 12. In addition, as the case may be, at least a frequency (preferably, a phase and amplitude) of one of the A random radio frequency voltage and B random radio frequency voltage may randomly be varied, while the other may be a radio frequency voltage with a constant frequency, phase, and amplitude.

Further, the time period during which the radio frequency voltage with the random frequency, phase, and amplitude is applied is not limited to 100 μsec in the first and second embodiments. The time period may be shorter or somewhat longer than 100 μsec. When the time period is set shorter, the rotational speed of the ultrasonic motor reaches a predetermined value more quickly, yet certainty in releasing the adhesion gets worse. Consequently, rising characteristics of the ultrasonic motor at start-up are deteriorated. When the time period is set longer, the adhesion can certainly be released. However, since a time taken until the rotation of the ultrasonic motor comes into a steady-state is longer, the rising characteristics are worsened. Therefore, it is preferred to measure a time required for releasing the adhesion and determine the time period to be a minimum required time so as to conform to characteristics of each ultrasonic motor.

The present disclosure relates to the subject matter contained in Japanese Patent Application No. P2006-336539, filed on Dec. 14, 2006, which is expressly incorporated herein by reference in its entirety.

What is claimed is:

1. An ultrasonic motor, comprising:
    a stator that includes a comb body with a plurality of circumferentially-arranged comb-like projections and a piezoelectric body integrally mounted on the comb body;
    a rotor rotatable with respect to the stator, the rotor having a contact surface that establishes pressure contact with the stator; and
    a driving circuit configured to apply a radio frequency voltage for driving the piezoelectric body to the piezoelectric body, and
    wherein the driving circuit comprises a voltage generating unit configured to generate a first radio frequency voltage of which a frequency is randomly varied during a predetermined time period after start-up of the ultrasonic motor.

2. The ultrasonic motor according to claim 1,
    wherein the voltage generating unit comprises:
        a first voltage generating portion configured to generate the first radio frequency voltage;
        a second voltage generating portion configured to generate a second radio frequency voltage with a constant frequency; and a selecting portion configured to select the first radio frequency voltage generated by the first voltage generating portion during the predetermined time period after the start-up of the ultrasonic motor, and to select the second radio frequency voltage generated by the second voltage generating portion thereafter.

3. The ultrasonic motor according to claim 2,
wherein the first radio frequency voltage includes two kinds of radio frequency voltages, at least one of which has a frequency being randomly varied, and
wherein the second radio frequency voltage includes two kinds of radio frequency voltages, which have a same frequency, a same amplitude, and phases different from each other by $\pi/2$.

4. The ultrasonic motor according to claim 2,
wherein the voltage generating unit is configured to generate the first radio frequency voltage with at least one of a phase and amplitude thereof being randomly varied as well as the frequency thereof.

5. The ultrasonic motor according to claim 2,
wherein the predetermined time period is approximately 100 μsec.

6. The ultrasonic motor according to claim 1,
wherein the voltage generating unit is configured to generate a second radio frequency voltage with a constant frequency, and
wherein the driving circuit further comprises a control unit configured to control the voltage generating unit to generate the first radio frequency voltage during the predetermined time period after the start-up of the ultrasonic motor and to generate the second radio frequency voltage thereafter.

7. The ultrasonic motor according to claim 6,
wherein the first radio frequency voltage includes two kinds of radio frequency voltages, at least one of which has a frequency being randomly varied, and
wherein the second radio frequency voltage includes two kinds of radio frequency voltages, which have a same frequency, a same amplitude, and phases different from each other by $\pi/2$.

8. The ultrasonic motor according to claim 6,
wherein the voltage generating unit is configured to generate the first radio frequency voltage with at least one of a phase and amplitude thereof being randomly varied as well as the frequency thereof.

9. The ultrasonic motor according to claim 6,
wherein the predetermined time period is approximately 100 μsec.

10. The ultrasonic motor according to claim 1,
wherein the voltage generating unit is configured to generate the first radio frequency voltage with at least one of a phase and amplitude thereof being randomly varied as well as the frequency thereof.

11. The ultrasonic motor according to claim 1,
wherein the predetermined time period is approximately 100 μsec.

* * * * *